(12) United States Patent
Vishwanathan et al.

(10) Patent No.: US 10,073,805 B2
(45) Date of Patent: Sep. 11, 2018

(54) VIRTUAL EXPANSION ROM IN A PCIE ENVIRONMENT

(71) Applicant: Avago Technologies General IP (Singapore) Pte. Ltd., San Jose, CA (US)

(72) Inventors: Rajendran Vishwanathan, San Jose, CA (US); Nagarajan Subramaniyan, San Jose, CA (US); Jeffrey Michael Dodson, Portland, OR (US); Jack Regula, Chapel Hill, NC (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 241 days.

(21) Appl. No.: 14/845,026

(22) Filed: Sep. 3, 2015

(65) Prior Publication Data

US 2017/0068636 A1 Mar. 9, 2017

(51) Int. Cl.
| | | |
|---|---|---|
| G06F 9/00 | (2006.01) | |
| G06F 13/42 | (2006.01) | |
| G06F 13/16 | (2006.01) | |
| G06F 9/50 | (2006.01) | |
| G06F 9/455 | (2018.01) | |

(52) U.S. Cl.
CPC .......... *G06F 13/4282* (2013.01); *G06F 13/16* (2013.01); *G06F 9/5077* (2013.01); *G06F 2009/45579* (2013.01)

(58) Field of Classification Search
CPC ................ G06F 2009/45579; G06F 9/5077
See application file for complete search history.

(56) References Cited

U.S. PATENT DOCUMENTS

| | | | |
|---|---|---|---|
| 8,521,941 B2 | 8/2013 | Regula | |
| 2006/0149954 A1* | 7/2006 | Hageman | G06F 9/4403 713/1 |
| 2013/0024595 A1 | 1/2013 | Subramaniyan et al. | |
| 2013/0159686 A1* | 6/2013 | Graham | G06F 9/5077 713/1 |

(Continued)

OTHER PUBLICATIONS

Dodson, SNIA Tutorial: PCIe Shared I/O, SNIA Global Education, Storage Networking Industry Association, 2015.

(Continued)

*Primary Examiner* — Zachary K Huson
(74) *Attorney, Agent, or Firm* — Sheridan Ross P.C.

(57) ABSTRACT

Methods and structure for utilizing a virtual Expansion ROM. One exemplary embodiment is a management device. The management device includes a memory, a Peripheral Component Interconnect Express (PCIe) link, and a processor. The memory stores Expansion Read-Only Memory (Expansion ROM) boot instructions for a host. The processor identifies devices in a PCIe hierarchy by transmitting PCIe enumeration requests via the PCIe link. The processor also generates a synthetic PCIe hierarchy that includes an added virtual Expansion ROM which is not present in the PCIe hierarchy, and provides responses describing the synthetic PCIe hierarchy to a host. Furthermore, the processor acquires PCIe read requests initiated by the host that are directed to the virtual Expansion ROM, and provides boot instructions to the host from the memory based on the PCIe read requests.

25 Claims, 9 Drawing Sheets

(56) References Cited

U.S. PATENT DOCUMENTS

| | | |
|---|---|---|
| 2013/0238885 A1 | 9/2013 | Tripathi et al. |
| 2015/0169331 A1 | 6/2015 | Nelogal et al. |
| 2015/0169487 A1 | 6/2015 | Subramaniyan et al. |
| 2015/0178096 A1 | 6/2015 | Inbaraj |

OTHER PUBLICATIONS

Malicious Code Execution in PCI Expansion ROM, Ethical Hacking Boot Camp, Infosec Institute, Jul. 21, 2015.
U.S. Appl. No. 14/203,149.

* cited by examiner

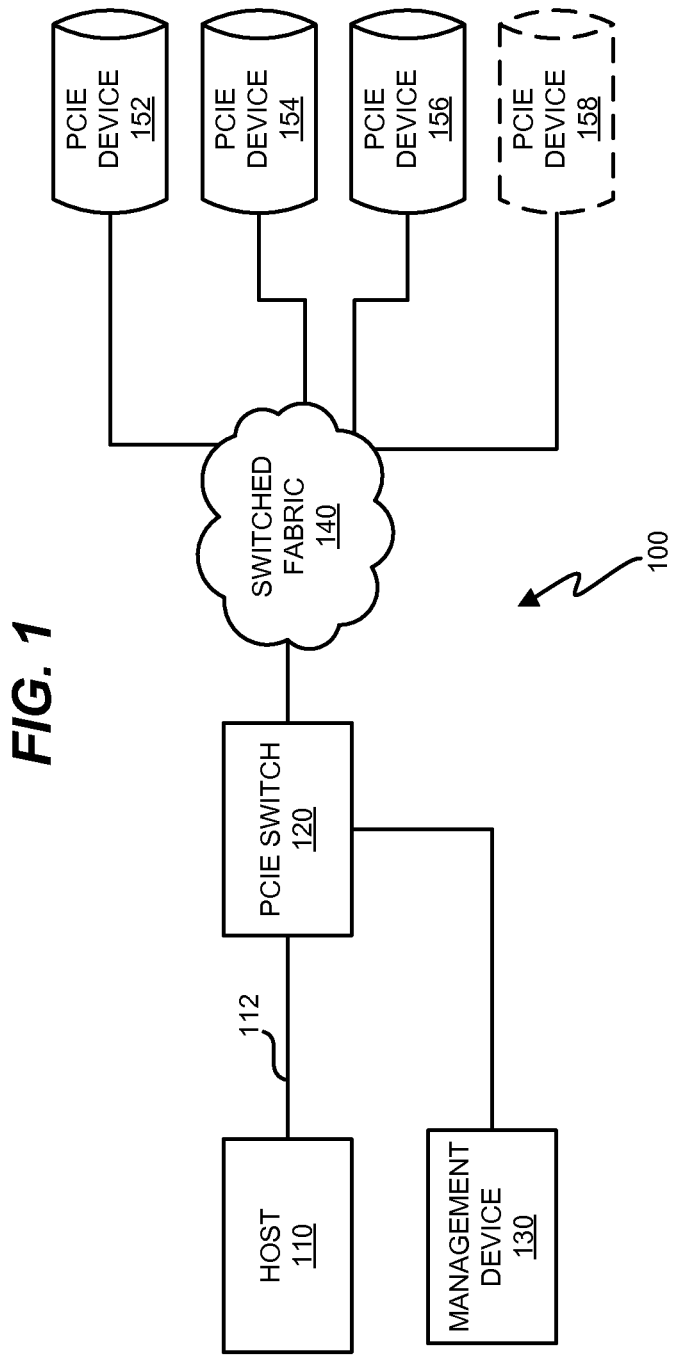

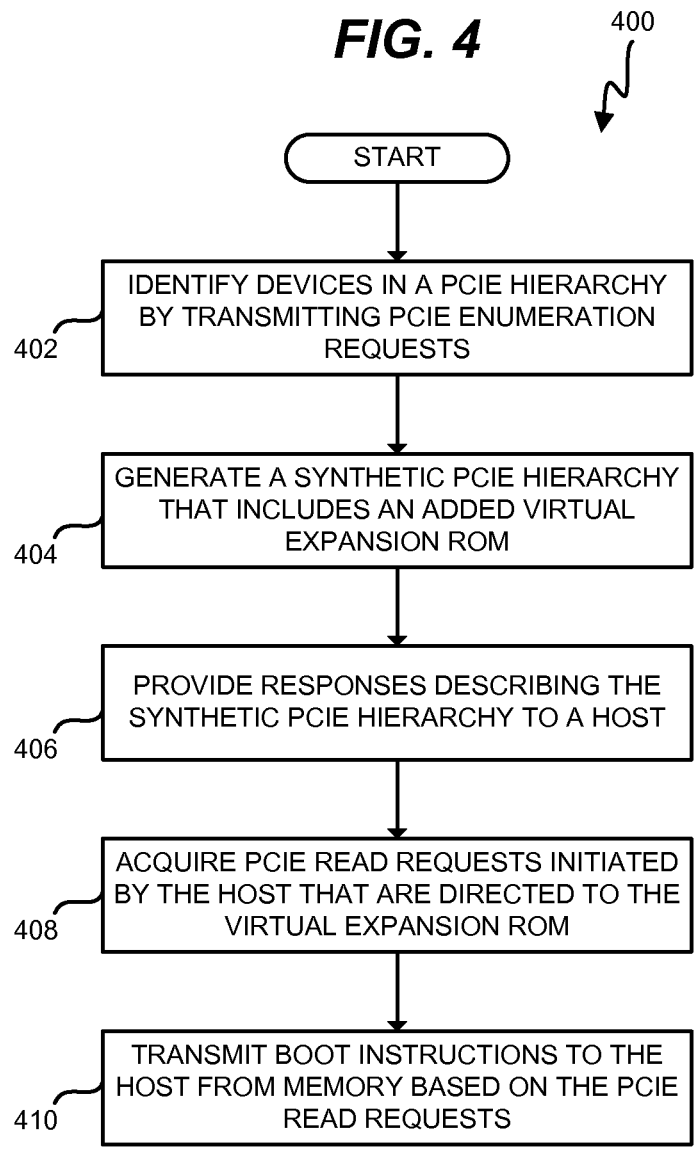

VIRTUAL EXPANSION ROM IN A PCIE ENVIRONMENT

FIELD OF THE INVENTION

The invention relates generally to electronic devices, and more specifically to Peripheral Component Interconnect Express (PCIe) devices.

BACKGROUND

Hosts often utilize what is known as Expansion Read Only Memory (Expansion ROM) in order to direct boot processes and enable an Operating System (OS) at the host to properly initialize. An Expansion ROM provides firmware boot instructions that are retrieved, for example, by a Basic Input/Output System (BIOS) of a host. A host BIOS can detect a PCIe device (e.g., an expansion card) that implements the Expansion ROM, and can access the expansion ROM via a PCIe link. The host BIOS can for example directly retrieve data from the Expansion ROM via PCIe read requests in order to acquire boot instructions needed by the OS.

SUMMARY

Systems and methods herein provide for a management device, which is capable of detecting a hierarchy of coupled PCIe devices, and modifying the hierarchy to add a virtual Expansion ROM. The management device can receive host requests directed to the virtual Expansion ROM, and can service the host requests by providing Expansion ROM boot instructions from internal memory.

One exemplary embodiment is a management device. The management device includes a memory, a Peripheral Component Interconnect Express (PCIe) link, and a processor. The memory stores Expansion Read-Only Memory (Expansion ROM) boot instructions for a host. The processor identifies devices in a PCIe hierarchy by transmitting PCIe enumeration requests via the PCIe link. The processor also generates a synthetic PCIe hierarchy that includes an added virtual Expansion ROM which is not present in the PCIe hierarchy, and provides responses describing the synthetic PCIe hierarchy to a host. Furthermore, the processor acquires PCIe read requests initiated by the host that are directed to the virtual Expansion ROM, and provides boot instructions to the host from the memory based on the PCIe read requests.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

FIG. 1 is a block diagram of an exemplary PCIe hierarchy.

FIG. 4 is a flowchart describing an exemplary method to present a virtual Expansion ROM to a host of a PCIe hierarchy.

DETAILED DESCRIPTION OF THE FIGURES

Figure 3:
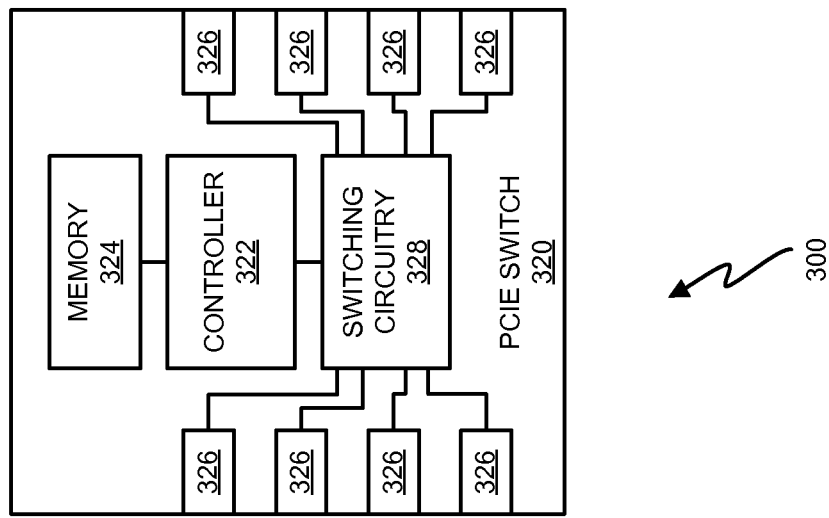
FIG. 3 is a block diagram illustrating an exemplary PCIe switch.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

FIG. 1 is a block diagram of an exemplary PCIe hierarchy 100. PCIe hierarchy 100 includes management device 130, which stores boot instructions for loading an Operating System (OS) of a host 110. Management device 130 is capable of presenting the boot instructions as a virtual Expansion ROM (also known as a virtual "Option ROM"). The virtual Expansion ROM is presented to host 110 as residing on a different device on the PCIe hierarchy than management device 130 (e.g., at PCIe device 158, which can itself be a real physical device or a virtual device). In this manner, management device 130 can provide Expansion ROM instructions without revealing its presence to host 110. This can be particularly useful in environments where management device 130 engages in sideband management of PCIe hierarchy 100, without the knowledge of host 110.

PCIe hierarchy 100 further comprises host 110, PCIe switch 120, serial PCIe link 112, switched fabric 140, and PCIe devices 152, 154, 156, and 158. Host 110 comprises a computer system that boots an OS (e.g., Microsoft Windows, Apple OS, Linux, Unix, etc.) for managing processing operations. Host 110 is coupled to PCIe switch 120 via PCIe link 112. In this embodiment, host 110 serves as the Root Complex for PCIe hierarchy 100. PCIe link 112 can comprise a ×2 ("by 2") multi-lane serial link, a ×4 link, a ×8 link, etc. Data transmitted via PCIe link 112 can be striped across the lanes in order to enhance the overall throughput of the link when servicing communications for host 110.

PCIe switch 120 comprises any component operable to receive PCIe requests from host 110 and route them to other devices. PCIe switch 120 has been enhanced to trap requests that are directed to the virtual Expansion ROM, and to forward trapped requests to management device 130 for processing. Management device 130 provides boot instructions to host 110 in response to host requests that were directed to the virtual Expansion ROM. In one embodiment, management device 130 also controls the PCIe configuration space for each device on PCIe hierarchy 100, and processes PCIe requests that are directed to the configuration spaces of devices in PCIe hierarchy 100. Controlling the configuration spaces of devices in PCIe hierarchy 100 enables management device 130 to modify how PCIe hierarchy 100 appears to host 110. For example, it can help management device 130 to mask its presence from host 110. This prevents host 110 from attempting to control or otherwise direct the actions of management device 130, which would be undesirable.

Switched fabric 140 comprises any combination of communication channels forming a bus structure operable to forward/route PCIe communications between the various interconnected devices of PCIe hierarchy 100. In one embodiment, switched fabric 140 comprises a combination of PCIe switches that are coupled with other PCIe devices via links. For example, in this embodiment PCIe devices 152, 154, and 156 are linked for communication with host 110 via switched fabric 140.

PCIe devices 152, 154, and 156 can comprise, for example, hard drives storing data accessible to host 110. PCIe device 158 can be implemented as a virtual PCIe device that exists only as mapping/routing data (e.g., at switch 120 or management device 130), or can be a real physical device. The configuration space data for device 158 indicates that device 158 is capable of providing Expansion ROM boot instructions to the host. Thus, if device 158 is a physical device, it can appear to be enhanced with Expansion ROM capabilities that it does not actually have. Alternatively, if device 158 is a virtual device, then management device 130 can present device 158 as having Expansion ROM capabilities.

When host 110 attempts to contact the PCIe address of the virtual Expansion ROM, PCIe switch 120 traps/intercepts the request and forwards it to management device 130, which in turn replies to the request with corresponding data from its internal memory. In one embodiment, the internal memory of management device 130 is not directly accessible via PCIe read requests, because for example the internal memory is not included within/mapped into the memory space of the PCIe hierarchy. In another example, the internal memory does not have an associated PCIe address. In a further embodiment, the internal memory is hidden because management device 130 has masked its entire presence from host 110, such that the PCIe address of management device 130 is provided to switch 120, but not to host 110 during device discovery. In this manner, host 110 is unable to determine that management device 130 exists, or that the Expansion ROM is actually implemented in an internal memory of management device 130.

In one embodiment, masking of the presence of management device 130 occurs as follows. Switch 120 traps incoming Transaction Layer Packets (TLPs) from host 110 and sends them to a circular buffer in memory at management device 130, encapsulating the entire TLP (i.e., both header and payload). An optional interrupt can inform management device 130 that its circular buffer has been updated. The management device analyzes the TLP in the circular buffer and, if necessary, creates a response TLP to be sent back to the host. The response TLP is created by a processor of management device 130 writing registers on switch 120. Management device 130 also updates hardware on switch 120 to account for routing incoming TLPs, such as by setting a base address. The TLPs handled in this manner can be configuration requests (reads and writes) as well as memory requests (reads and writes). And, all TLPs but memory write requests can receive a response completion TLP. From the point of view of the host, a TLP read request was sent to the switch and a TLP read completion response was received. Hence, the rerouting specifics related to management device 130 are all hidden from the perspective of host 110.

Figure 2:
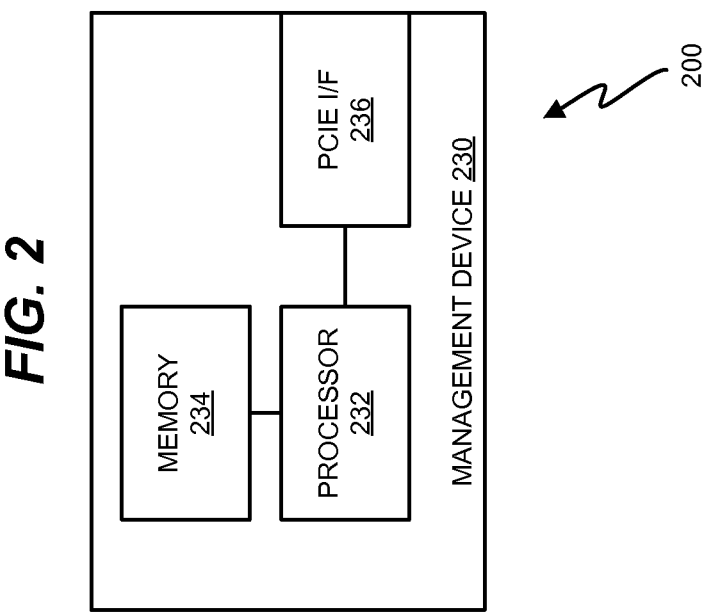
FIG. 2 is a block diagram illustrating an exemplary management device.

Details of an exemplary management device are provided in block diagram 200 of FIG. 2. According to FIG. 2, management device 230 includes processor 232, internal memory 234, and PCIe interface (I/F) 236. Processor 232 comprises any suitable combination of custom and/or general purpose processing circuitry. Memory 234 stores instructions for operating processor 232, and furthermore maintains boot instructions for a host device. In a further embodiment, memory 234 also stores configuration space data for one or more devices on PCIe hierarchy 100 (e.g., PCIe device 158). The memory need not initially store the Expansion ROM and in fact at power up memory 234 can be blank. Switch 120 can then trap and reroute requests directed to the configuration space of device 158, sending the requests to management device 130. Memory 234 can be implemented via any suitable memory technology, such as a volatile or non-volatile data storage technology. PCIe I/F 236 is operated by processor 232 in order to engage in communications with other devices on PCIe hierarchy.

In a still further embodiment, management device 230 can store Expansion ROM instructions in any free memory space available at any coupled PCIe device in the PCIe hierarchy. This can further comprise updating the configuration space of that device in order to indicate its new Expansion ROM capabilities.

Further details of an exemplary PCIe switch are described with respect to block diagram 300 of FIG. 3, wherein switch 320 is depicted. According to FIG. 3, switch 320 includes a controller 322, memory 324, multiple PCIe ports 326, and switching circuitry 328. Controller 322 manages the general operations of switch 230, and can be implemented as custom circuitry, a processor executing programmed instructions stored in program memory, or some combination thereof. Ports 326 each comprise a set of transmitter(s) and receiver(s) located at switch 320 that utilize a PCIe link for communications. Switching circuitry 328 manages the exchange of data between various ports 326 in order to service communications between coupled PCIe devices. Memory 324 stores instructions for controlling switch 320, and further comprises instructions for trapping and redirecting incoming requests to a management device. In one embodiment, memory 324 stores instructions for trapping PCIe requests directed to the virtual Expansion ROM, and redirecting trapped requests to the management device. In a further embodiment, memory 324 stores instructions for trapping received PCIe configuration space requests (e.g., for any device in PCIe hierarchy 100), and redirecting trapped requests to the management device.

The particular arrangement, number, and configuration of components described herein is exemplary and non-limiting. Further details of the operation of PCIe hierarchy 100 will be provided with respect to FIG. 4 below. Assume, for this embodiment, that the devices of PCIe hierarchy 100 have powered on, and are awaiting discovery communications for identifying other devices on PCIe hierarchy 100 (e.g., other devices that are located within the same PCIe address space as host 110).

FIG. 4 is a flowchart describing an exemplary method 400 to present a virtual Expansion ROM to a host of a PCIe hierarchy. In step 402, a processor of management device 130 identifies other devices in PCIe hierarchy 100 by transmitting PCIe enumeration requests via a PCIe link. Based on the responses to those enumeration requests, management device 130 is capable of determining the identity and capabilities of the other devices on PCIe hierarchy 100. This knowledge of devices in PCIe hierarchy 100 is referred to as a "map" or "topology." As used herein, a "map" of a PCIe hierarchy comprises a list of devices and associated PCIe addresses, and in one embodiment it further comprises configuration space information for those devices.

In step 404, the processor of management device 130 generates a synthetic (e.g., a virtual, falsified and/or modified) map of PCIe hierarchy 100. The modified map includes an added virtual Expansion ROM. In one embodiment, the virtual Expansion ROM is added to a list of capabilities in the configuration space of a physical PCIe device in the PCIe hierarchy. In another embodiment, the map is modified by adding a virtual PCIe device with an Expansion ROM to the PCIe hierarchy. After the modified map of the PCIe hierarchy has been generated, in step 406 the processor of management device 130 provides the responses describing the synthetic PCIe hierarchy to host 110 (e.g., in response to PCIe enumeration requests generated by host 110). That is, after management device 130 generates a synthetic PCIe hierarchy for host 110, it allows host 110 to enumerate to discover that synthetic PCIe hierarchy. During this process, PCIe switches detecting enumeration requests from host 110 trap those requests and send the requests to management device 130.

After the modified map of PCIe hierarchy 100 has been provided to host 110, host 110 can attempt to communicate with the virtual Expansion ROM indicated in the modified map. To this end, host 110 can generate one or more PCIe read requests directed to the virtual Expansion ROM. These requests are detected by PCIe switch 120, trapped, and then forwarded to management device 130. In one embodiment, upon receiving a Transaction Layer Packet (TLP) for a host request at one of its ports, a controller of switch 120 determines how to route the host request. For example, if the controller detects that the request is directed to the virtual Expansion ROM, PCIe switch 120 intercepts/traps the request and redirects it to management device 130.

In step 408, a processor of management device 130 acquires the trapped PCIe read requests that were initiated by the host and directed to the virtual Expansion ROM. In step 410, the processor operates a PCIe interface at the management device to transmit boot instructions to the host from internal memory, based in information in the PCIe read requests. For example, management device 130 can analyze the contents of the request (e.g., a TLP for the request), and correlate the contents of the request with instructions stored in memory 234. That is, if a PCIe read request is directed to a specific set of blocks in the virtual Expansion ROM, then management device 130 can respond with corresponding boot instructions from its own internal memory. A host can request multiple sets of blocks across multiple requests in order to fully boot. The boot instructions can be utilized, for example, to facilitate a Preboot Execution Environment (PXE) boot at host 110. In one embodiment, boot instructions comprise a datastream interpreted by a processor of host 110 that enables it further functioning, such as by loading a preboot or operating system.

Even though the steps of method 400 are described with reference to PCIe hierarchy 100 of FIG. 1, method 400 can be performed in other PCIe environments as desired. The steps of the flowcharts described herein are not all inclusive and can include other steps not shown. The steps described herein can also be performed in an alternative order.

Figure 5:
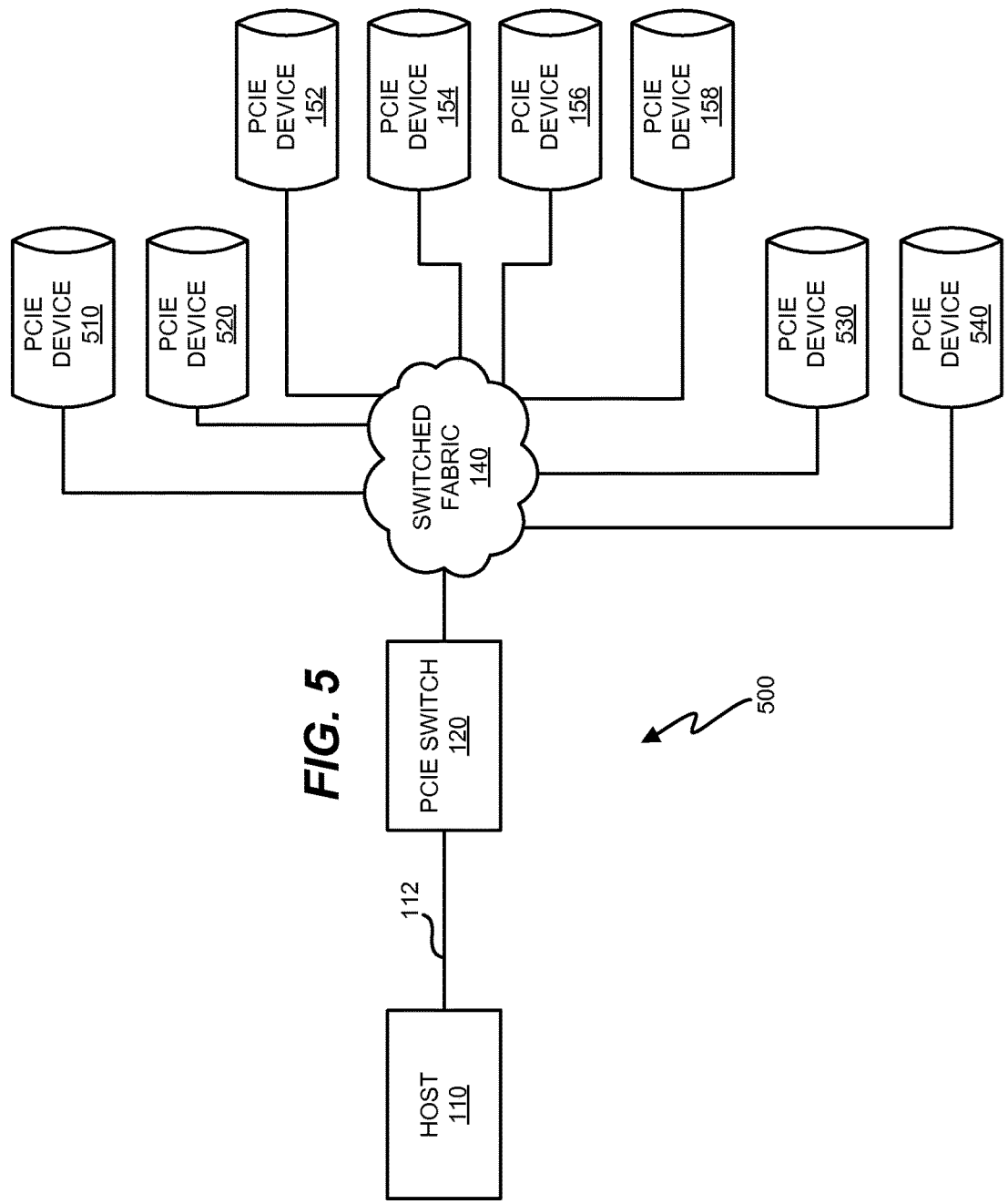
FIGS. 5-6 are block diagrams illustrating exemplary PCIe hierarchies as viewed by a host and a management device, respectively.
Figure 6:
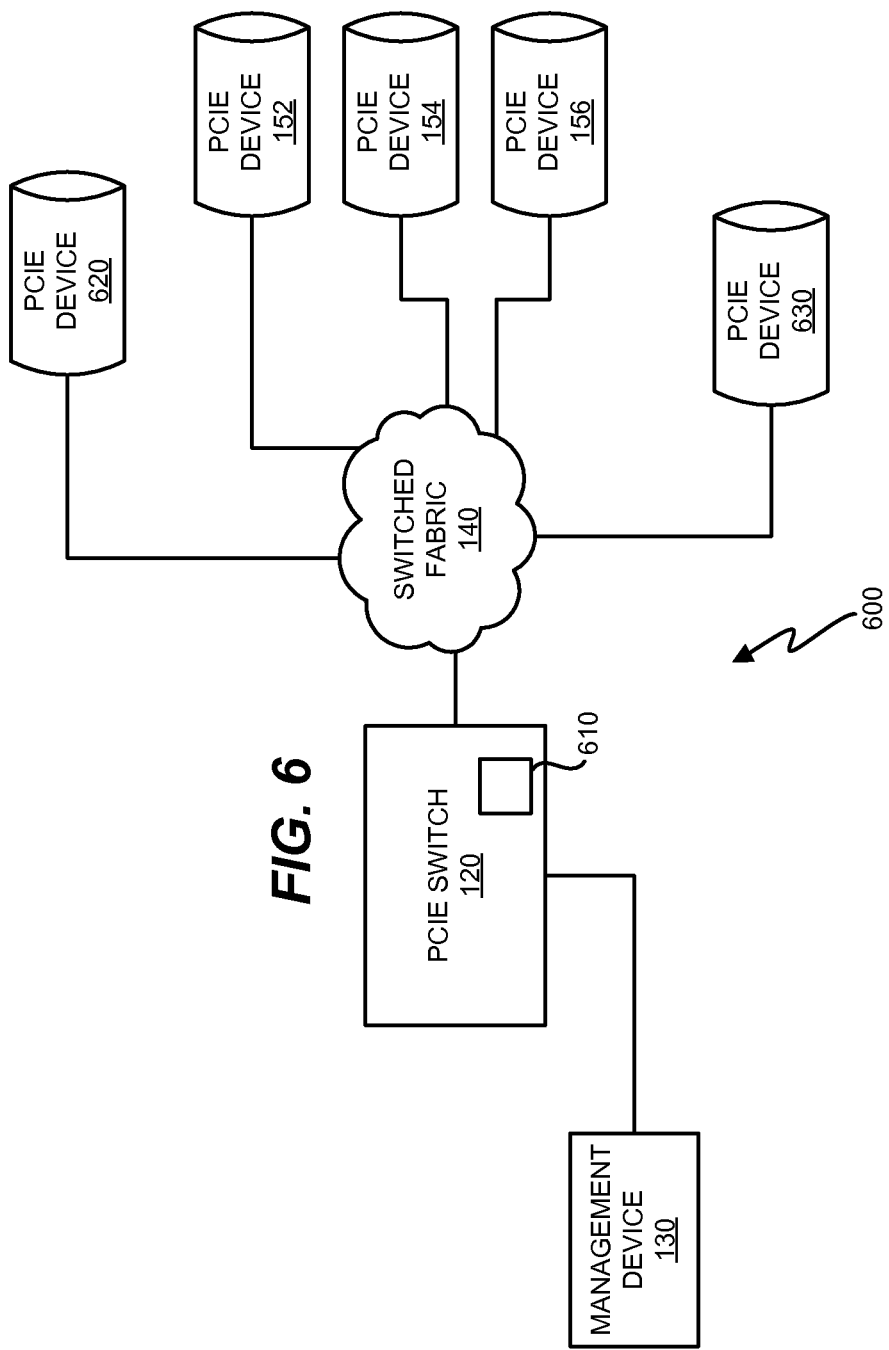

FIGS. 5-6 are block diagrams illustrating exemplary PCIe hierarchies as viewed by a host and a management device, respectively. Specifically, FIG. 5 is a block diagram 500 that illustrates an exemplary synthetic PCIe hierarchy presented to host 110. In this embodiment, the synthetic PCIe hierarchy presents numerous devices that do not actually physically exist, or are presented as having modified capabilities. For example, PCIe devices 510-540 are all virtual devices that are not physically present, while PCIe device 158 is presented as discussed above with regard to FIG. 1. FIG. 6 is a block diagram 600 illustrating an exemplary PCIe hierarchy maintained by a management device. In this embodiment, host 110 is invisible to management device 130, and is not directly communicated with by management device 130 without utilizing switch 120 as an intermediary. The PCIe hierarchy also includes PCIe devices 620 and 630 (which are physically present but, masked from host 110 and therefore not shown in FIG. 5), as well as an internal target/endpoint 610, which, when discovered by management device 130, loads management software for management device 130.

In one embodiment, an internal memory of a management device stores sets of boot instructions for different processor architectures (e.g., a set of boot instructions for Complex Instruction Set Computing (CISC) processor architectures, and a set of boot instructions for Reduced Instruction Set Computing (RISC) processor architectures). In a further embodiment, the internal memory stores sets of boot instructions for different operating systems (e.g., an Apple OS instead of a Microsoft OS). When the management device detects an incoming request for boot instructions, it determines which set of boot instructions to use. This can be based on preprogrammed data describing the processor architecture and/or OS used by the host, or can be based on inquiries performed by the management device during device discovery. Based on the determined knowledge about the host, the management device selects a set of boot instructions to transmit to the host. In this manner, the management device causes multiple sets of instructions to appear to the host as a single, uniform Expansion ROM. In a multi-host environment, the virtual Expansion ROM can appear as one type of Expansion ROM to one host, while it appears as an entirely different type of Expansion ROM to another host.

A similar technique can be utilized to service boot operations for a Single Root Input/Output Virtualization (SR-IOV) host. In this environment, the host can comprise a Physical Function (PF) having its own configuration space and host-side boot instructions, which can be used as a baseline from which multiple Virtual Functions (VFs) are booted. When the VFs need an Expansion ROM to properly initialize, the management device can selectively provide a different set of boot instructions from internal memory to each VF, based on the needs and/or identity of that VF.

Figure 7:
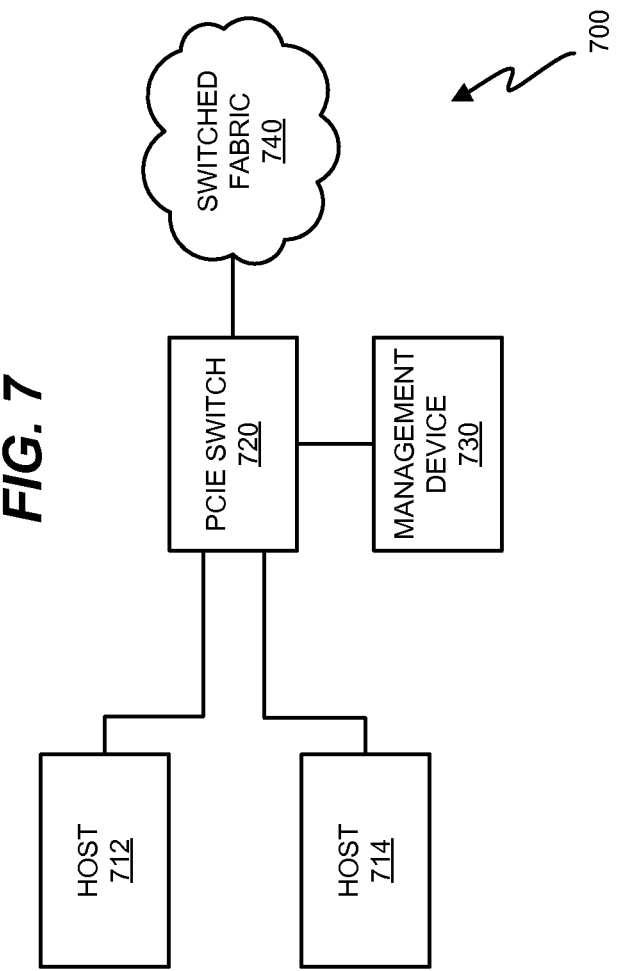
FIG. 7 is a block diagram illustrating an exemplary multi-host boot environment.

FIG. 7 is a block diagram 700 illustrating an exemplary multi-host boot environment. In this embodiment, PCIe switch 720 is coupled for communication with two different PCIe hosts (712, 714) that each utilize a different OS or processor architecture. Management device 730 presents the same virtual Expansion ROM to both hosts, so that both hosts associate the Expansion ROM with the same PCIe address. After management device 730 acquires a request from one of the hosts that is directed to the virtual Expansion ROM, it determines the OS and/or processor architecture of that host, and then provides the appropriate set of instructions for booting that host. In this manner, both hosts view the virtual PCIe device as maintaining the exact same Expansion ROM, even though the boot instructions provided via the virtual Expansion ROM can vary.

Figure 8:
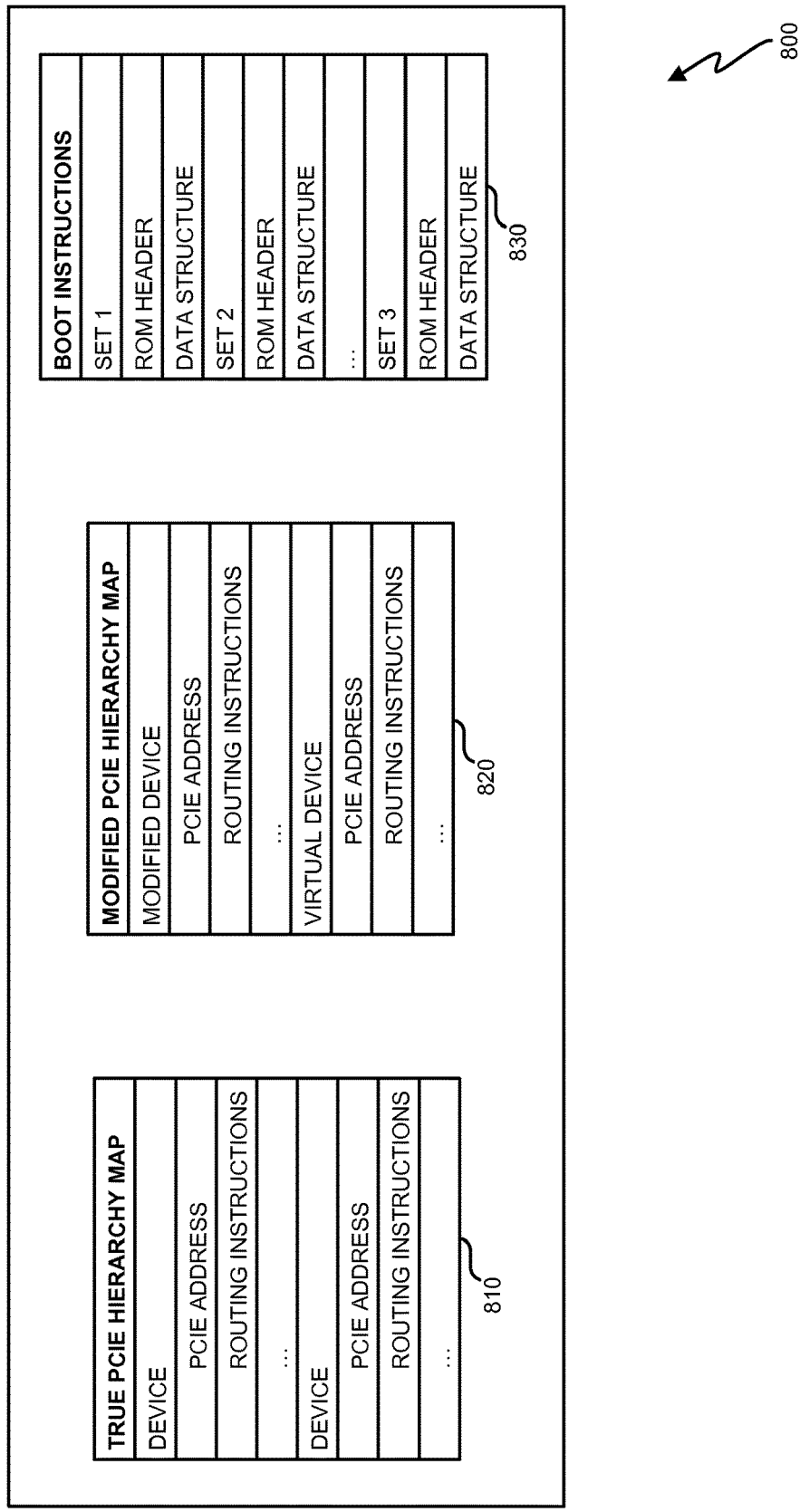
FIG. 8 is a block diagram illustrating contents of an exemplary internal memory management device.

FIG. 8 is a block diagram 800 illustrating contents of an exemplary internal memory of a management device. According to FIG. 8, memory 800 includes three separate portions. The first portion 810 comprises a "true" PCIe hierarchy map indicating the arrangement of PCIe devices as they actually exist within the PCIe hierarchy. In this embodiment portion 810 indicates the PCIe address, routing instructions, and/or configuration space data for each of one or more PCIe devices. Meanwhile, the second portion 820 of memory 800 comprises modified/synthetic PCIe hierarchy map. This modified PCIe hierarchy map includes the same types of information found in the true PCIe hierarchy map, except that certain portions are modified/altered. For example, the management device can remove itself from the modified PCIe hierarchy map to mask its presence from a host, and/or the management device can modify the data describing a physical device in order to make the device appear to support Expansion ROM capabilities.

In one embodiment, the management device synthesizes PCIe enumeration responses to provide to hosts. The host is trying to discover what is there via its PCIe enumeration requests and the responses from the management device tell the host what devices reside on the PCIe hierarchy. Since the management device is running software, it can present any sort of synthetic PCIe hierarchy to the host via its PCIe enumeration responses. This is true regardless of what the actual, physical PCIe hierarchy is. Thus, one host can be presented with the same PCIe hierarchy, or an entirely different PCIe hierarchy, than another host. The management device can use hardware mapping via a coupled switch to translate host requests (directed to a synthetic PCIe hierarchy) into requests that travel along the physical PCIe hierarchy.

If the management device includes a virtual PCIe device in the modified PCIe hierarchy map, then the virtual device can be assigned a unique PCIe address by the host. The information can further include, for example, a "spoofed" PCIe address for the virtual PCIe device, a Base Address Register (BAR) for the virtual PCIe device, etc. Memory 800 can further store information describing one or more hosts expected to communicate with a virtual PCIe device. For example, the host information can indicate a PCIe address of the host, a processor architecture utilized by the host, an OS used by the host, a port at the switch that is expected to receive communications from the host, etc.

Third portion 830 of memory 800 includes multiple sets of boot instructions that each comprise a PCIe ROM header, as well as a PCIe data structure that stores the boot instructions themselves. The management device can selectively choose a set of boot instructions to provide, based on the identity of the host and/or VF that is requesting the boot instructions.

EXAMPLES

In the following examples, additional processes, systems, and methods are described in the context of an actively operating PCIe hierarchy.

Figure 9:
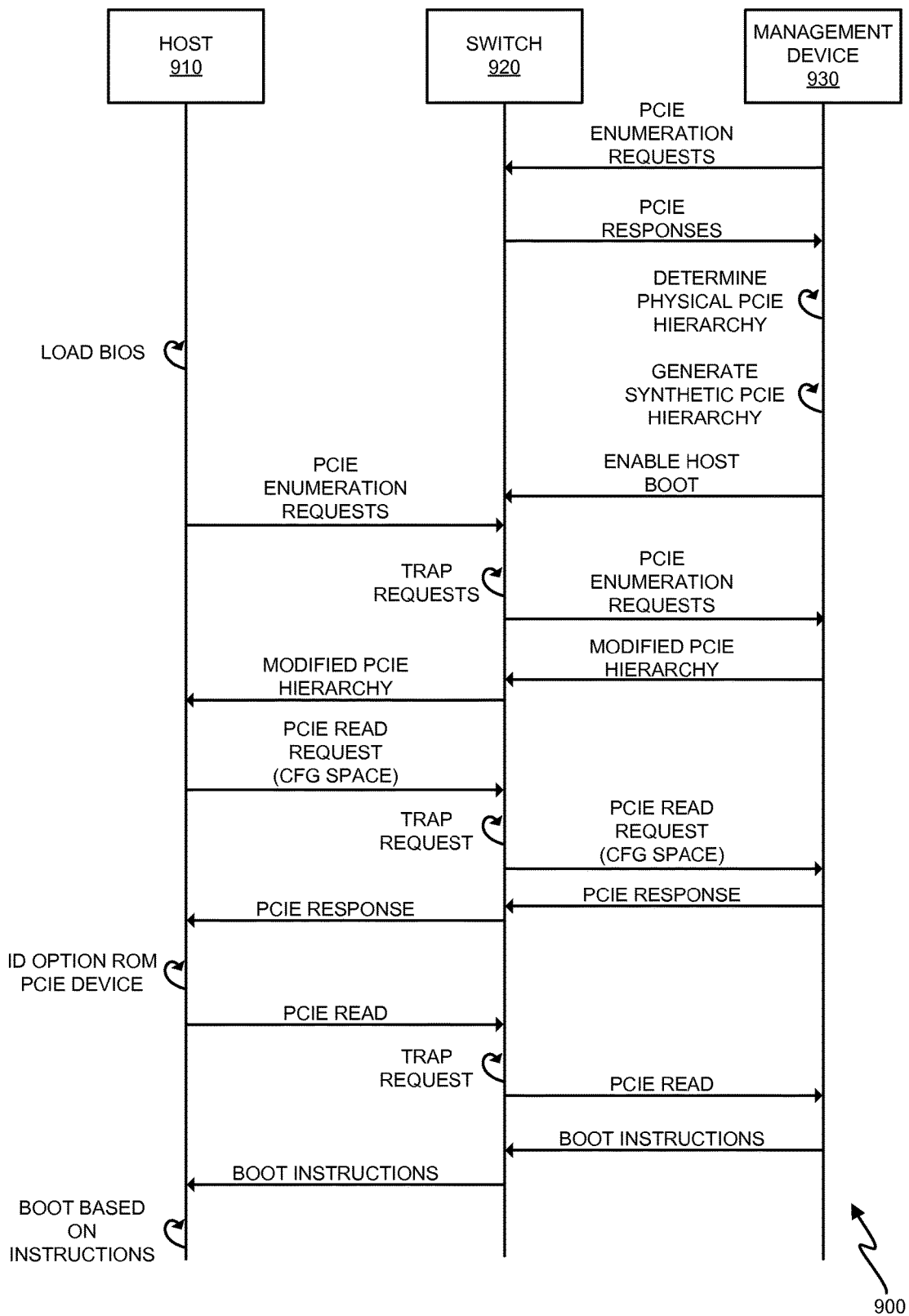
FIG. 9 is a message diagram illustrating exemplary communications between PCIe devices on a PCIe hierarchy to implement a virtual Expansion ROM.

FIG. 9 is a message diagram 900 illustrating exemplary communications between devices in a PCIe hierarchy. According to FIG. 9, management device 930 activates at power on, and initializes by generating and transmitting a series of PCIe enumeration requests via switch 920 to coupled devices on the same PCIe hierarchy.

Thus, a BIOS of management device 930 enumerates and discovers the physical PCIe hierarchy in which it is placed. As part of the enumeration process, a database on management device 130 is saved that acts as a map to all devices on the PCIe hierarchy. The database saves the bus number and bus number range for each element/device in the hierarchy. It also saves the 32 bit and 64 bit memory address range for each element/device in the hierarchy. PCIe rules for bridge ensure that all (bus, 32 b memory, 64 b memory) downstream devices (i.e., all devices that are further away from root complex) for a single path (downstream port of a switch) fall into one range. For example, if there are five buses below a switch port, the devices would be in a range of x to x+4, and would not be x, x+10, x−2, random numbers, etc. When management device 930 detects an internal endpoint at switch 920, it loads management software from the internal endpoint for performing higher-level operations. The host assignment of bus, 32 b memory, and 64 b memory will likely not match the assignments provided by management device 930. Thus, tables in switch 920 allow for auto-translation from host domain to management device domain numbering, and vice versa.

Based on the responses to those PCIe enumeration requests, management device 930 constructs a map of the PCIe hierarchy, including child/parent relationships, PCIe addresses, bus numbers, and/or other information. Management device 930 further determines the PCIe configuration space of each device, based responses to its requests. After a map of the PCIe hierarchy has been determined, management device 930 proceeds to generate a synthetic PCIe hierarchy that is based on the physical PCIe hierarchy. The synthetic PCIe hierarchy includes a virtual device that does not exist in the physical PCIe hierarchy. Instead, software at management device 930 decides to create the virtual device for the host to find.

One or more synthetic hierarchies can be generated and maintained by management device 930, to service requests from various hosts. This is accomplished in one embodiment by adding a virtual PCIe device to the hierarchy map and assigning the virtual PCIe device its own PCIe address and Expansion ROM capabilities. In a further embodiment, the modified PCIe hierarchy map includes a modified set of capabilities (e.g., an Expansion ROM capability) for a physical device on the PCIe hierarchy that does not actually support an Expansion ROM. Management device 930 then transmits a PCIe command to switch to enable host 910 to boot. Until this point switch 920 only provides configuration retry responses to host 910, which prevents host enumeration from occurring. In response to the command from management device 930, switch 920 starts to facilitate host requests by exiting the configuration retry state.

Host 910 initializes by loading a BIOS, and then performing discovery of other PCIe devices via PCIe enumeration requests. Host 910 then transmits its own PCIe enumeration requests to other devices on the PCIe hierarchy, via switch 920. Switch 920 determines, based on the TLP packets of these requests, that the requests are enumeration requests from host 910, and therefore traps and routes these requests to management device 930. Management device 930 then provides modified PCIe hierarchy information to host 910 in response to the enumeration requests. This masks the true configuration of the PCIe hierarchy from host 910.

After host 910 has identified coupled devices based on the modified PCIe hierarchy information from management device 930, host 910 attempts to determine the capabilities of each coupled PCIe device. To this end, host 910 generates PCIe read requests directed to the configuration space of PCIe devices in the hierarchy. Switch 920 detects these requests as being directed to configuration space (based on their TLP packets) and proceeds to forward these requests to management device 930. Management device 930 then provides capability information to the host in a series of PCIe responses indicating the capabilities of various PCIe devices in the modified hierarchy. The capability information for at least one of the devices in the modified PCIe hierarchy indicates an Expansion ROM capability.

Host 910 identifies the presence of the virtual Expansion ROM on a device based on the PCIe responses from management device 930. Host 910 then generates a PCIe read request directed to the device in the modified PCIe hierarchy that has the virtual Expansion ROM. Unbeknownst to host 910, the PCIe device is either a real device that does not include an Expansion ROM, or is a virtual device. Switch 920 detects the incoming PCIe read request, traps it, and forwards it on to management device 930. Management device 930 interprets the PCIe read request in order to identify which addresses in memory were requested by host 910 (e.g., which addresses in the virtual Expansion ROM memory were requested by host 910, and which addresses in internal memory are correlated therewith), and provides the relevant data to host 910. Host 910 can continue to request more instructions, until the boot process for an OS at host 910 is complete.

Figure 10:
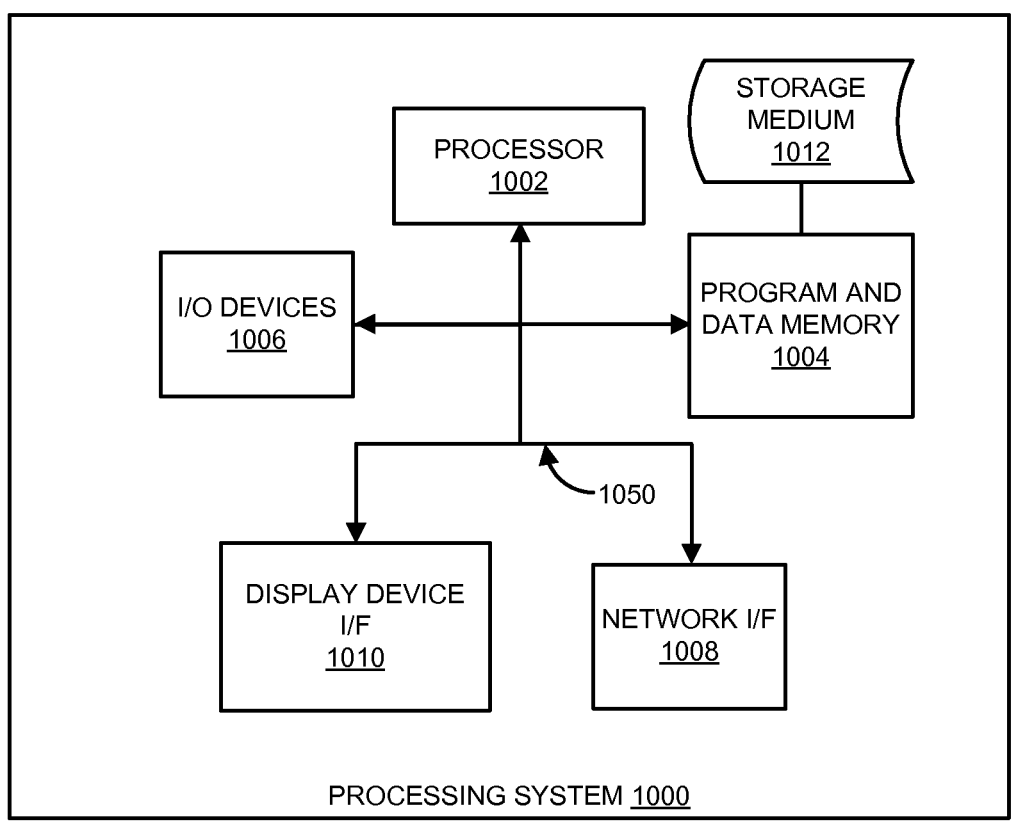
FIG. 10 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of a PCIe device to perform the various operations disclosed herein. FIG. 10 illustrates an exemplary processing system 1000 operable to execute a computer readable medium embodying programmed instructions. Processing system 1000 is operable to perform the above operations by executing programmed instructions tangibly embodied on computer readable storage medium 1012. In this regard, embodiments of the invention can take the form of a computer program accessible via computer readable medium 1012 providing program code for use by a computer (e.g., processing system 1000) or any other instruction execution system. For the purposes of this description, computer readable storage medium 1012 can be anything that can contain or store the program for use by the computer (e.g., processing system 1000).

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being used for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 can also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 can be integrated with the system to interface to one or more display devices, such as printing systems and screens for presentation of data generated by processor 1002.

What is claimed is:

1. A management device comprising:
   a memory storing Expansion Read-Only Memory (Expansion ROM) boot instructions for a host;
   a Peripheral Component Interconnect Express (PCIe) link; and
   a processor operable to identify devices in a PCIe hierarchy by transmitting PCIe enumeration requests via the PCIe link, to generate synthetic PCIe hierarchy that includes an added virtual Expansion ROM which is not present in the PCIe hierarchy, to provide responses describing the synthetic PCIe hierarchy to a host, to acquire PCIe read requests initiated by the host that are directed to the virtual Expansion ROM, and to provide boot instructions to the host from the memory based on the PCIe read requests
   wherein the processor is further operable to mask the management device from the host by excluding the management device from the synthetic PCIe hierarchy and from a modified map describing the synthetic PCIe hierarchy thereby enabling the management device to engage in sideband management of the PCIe hierarchy without the knowledge of host.

2. The management device of claim 1, wherein:
   the memory stores one set of boot instructions for Complex Instruction Set Computing (CISC) processors, and another set of boot instructions for Reduced Instruction Set Computing (RISC) processors, and
   the processor is further operable to select a set of boot instructions to transmit to the host, based on whether the host utilizes a CISC processor or a RISC processor.

3. The management device of claim 1, wherein:
   the host comprises a Single Root Input/Output Virtualization (SR-IOV) host, and the memory stores multiple sets of boot instructions that each correspond with a different Virtual Function (VF).

4. The management device of claim 1, wherein:
   the processor is operable to maintain configuration space data, in the memory, for the devices in the PCIe hierarchy, and to acquire and process requests initiated by the host that are directed to configuration space.

5. The management device of claim 1, wherein:
   the processor is further operable to generate a modified map of the PCIe hierarchy by adding the virtual Expansion ROM to a device on the PCIe hierarchy.

6. The management device of claim 1, wherein:
   the processor is further operable to generate a modified map of the PCIe hierarchy by adding a virtual device, comprising the virtual Expansion ROM, to the PCIe hierarchy.

7. A method comprising:
   identifying devices in a PCIe hierarchy by transmitting PCIe enumeration requests via a PCIe link of a management device;
   generating a synthetic PCIe hierarchy that includes an added virtual Expansion ROM which is not present in the PCIe hierarchy;
   providing responses describing the synthetic PCIe hierarchy to a host;

enabling the management device to engage in sideband management of the PCIe hierarchy without the knowledge of the host;
acquiring PCIe read requests initiated by the host that are directed to the virtual Expansion ROM; and
transmitting boot instructions to the host from internal memory of the management device based on the PCIe read requests.

8. The method of claim 7, wherein:
the memory stores one set of boot instructions for Complex Instruction Set Computing (CISC) processors, and another set of boot instructions for Reduced Instruction Set Computing (RISC) processors, and
the method further comprises selecting a set of boot instructions to transmit to the host, based on whether the host utilizes a CISC processor or a RISC processor.

9. The method of claim 7, wherein:
the host comprises a Single Root Input/Output Virtualization (SR-IOV) host, and the memory stores multiple sets of boot instructions that each correspond with a different Virtual Function (VF).

10. The method of claim 7, further comprising:
maintaining configuration space data, in the memory, for each device in the PCIe hierarchy; and
acquiring and processing requests initiated by the host that are directed to configuration space.

11. The method of claim 7, further comprising:
generating a modified map of the PCIe hierarchy by adding the virtual Expansion ROM to a device on the PCIe hierarchy.

12. The method of claim 7, further comprising:
generating a modified map of the PCIe hierarchy by adding a virtual device, comprising the virtual Expansion ROM, to the PCIe hierarchy.

13. A non-transitory computer readable medium embodying programmed instructions which, when executed by a processor of a Peripheral Component Interconnect Express (PCIe) switch, are operable for directing the processor to:
generate a synthetic PCIe hierarchy that includes an added virtual Expansion ROM which is not present in the PCIe hierarchy;
provide responses describing the synthetic PCIe hierarchy from a management device to a host;
enable the management device to engage in sideband management of the PCIe hierarchy without the knowledge of the host;
acquire PCIe read requests initiated by the host that are directed to the virtual Expansion ROM; and
transmit boot instructions to the host from internal memory at the management device based on the PCIe read requests.

14. The medium of claim 13, wherein:
the memory stores one set of boot instructions for Complex Instruction Set Computing (CISC) processors, and another set of boot instructions for Reduced Instruction Set Computing (RISC) processors, and
the instructions further direct the processor to select a set of boot instructions to transmit to the host, based on whether the host utilizes a CISC processor or a RISC processor.

15. The medium of claim 13, wherein:
the host comprises a Single Root Input/Output Virtualization (SR-IOV) host, and the memory stores multiple sets of boot instructions that each correspond with a different Virtual Function (VF).

16. The medium of claim 13, wherein the instructions further direct the processor to:
maintain configuration space data, in the memory, for each device in the PCIe hierarchy; and
acquire and process requests initiated by the host that are directed to configuration space.

17. The medium of claim 13, wherein the instructions further direct the processor to:
generate a modified map of the PCIe hierarchy by adding the virtual Expansion ROM to a device on the PCIe hierarchy.

18. The medium of claim 13, wherein the instructions further direct the processor to:
generate a modified map of the PCIe hierarchy by adding a virtual device, comprising the virtual Expansion ROM, to the PCIe hierarchy.

19. A system comprising:
a Peripheral Component Interconnect Express (PCIe) switch comprising:
multiple PCIe ports;
a memory storing routing instructions for devices in a PCIe hierarchy; and
a controller operable to direct the operations of switching circuitry based on the routing instructions in memory, wherein the controller is further operable to trap incoming PCIe requests from a host that are directed to an Expansion Read Only Memory (ROM); and
a management device operable to receive trapped requests from the PCIe switch via a PCIe link, the management device comprising:
a memory that stores boot instructions for the host and that is not mapped into a memory space of the PCIe hierarchy; and
a processor operable to service received trapped requests from the PCIe switch with the boot instructions, wherein the host requests multiple sets of blocks across multiple requests to fully boot, wherein the processor of the management device responds to each of the multiple requests with corresponding boot instructions from memory of the management device, and wherein the processor of the management device masks the management device from the host by excluding the management device from a synthetic PCIe hierarchy and from a modified map describing the synthetic PCIe hierarchy thereby enabling the management device to engage in sideband management of the PCIe hierarchy without the knowledge of host.

20. The system of claim 19, wherein:
the controller of the PCIe switch is further operable to identify incoming requests from the host that are directed to a PCIe configuration space of a device in the PCIe hierarchy, and to trap and transmit the identified requests to the management device.

21. The system of claim 19, wherein:
the controller of the PCIe switch is operable to determine that an incoming request is directed to a virtual Expansion ROM based on a PCIe address indicated in the incoming request.

22. The system of claim 21, wherein:
the virtual Expansion ROM is associated with a virtual PCIe device that is not physically present on the PCIe hierarchy.

23. The system of claim 21, wherein:
the virtual Expansion ROM is associated with a PCIe device that is physically present on the PCIe hierarchy, but does not have Expansion ROM capabilities.

24. A system comprising:
a management device comprising:
- a memory storing Option Read-Only Memory (Option ROM) boot instructions for a host;
- a Peripheral Component Interconnect Express (PCIe) link; and
- a processor operable to falsify a PCIe hierarchy presented to a host by inserting a virtual PCIe device into the PCIe hierarchy, to acquire PCIe read requests that query the capabilities of the virtual PCIe device, to transmit a PCIe response that indicates the virtual PCIe device has Option ROM capabilities, and to service PCIe requests that are directed to the virtual PCIe device by selectively choosing a set of boot instructions from the memory based on an identity of the host and based on a Virtual Function (VF) that is requesting the boot instructions, and wherein the processor masks the management device from the host by excluding the management device from the falsified PCIe hierarchy and from a modified map describing the falsified PCIe hierarchy thereby enabling the management device to engage in sideband management of the PCIe hierarchy without the knowledge of host.

25. The system of claim 24, wherein:
the PCIe response includes a header with a PCIe address for the virtual PCIe device, instead of a PCIe address for the management device.

* * * * *